US011836616B2

(12) United States Patent
Weng et al.

(10) Patent No.: US 11,836,616 B2
(45) Date of Patent: Dec. 5, 2023

(54) AUDITABLE PRIVACY PROTECTION DEEP LEARNING PLATFORM CONSTRUCTION METHOD BASED ON BLOCK CHAIN INCENTIVE MECHANISM

(71) Applicant: Jinan University, Guangdong (CN)

(72) Inventors: Jian Weng, Guangdong (CN); Jiasi Weng, Guangdong (CN); Ming Li, Guangdong (CN); Yue Zhang, Guangdong (CN); Jilian Zhang, Guangdong (CN); Weiqi Luo, Guangdong (CN)

(73) Assignee: Jinan University, Guangzhou (CN)

( * ) Notice: Subject to any disclaimer, the term of this patent is extended or adjusted under 35 U.S.C. 154(b) by 635 days.

(21) Appl. No.: 16/702,786

(22) Filed: Dec. 4, 2019

(65) Prior Publication Data
US 2020/0193292 A1 Jun. 18, 2020

(30) Foreign Application Priority Data

Dec. 4, 2018 (CN) .......................... 201811471842.X

(51) Int. Cl.
*G06N 3/08* (2023.01)
*G06F 16/23* (2019.01)
(Continued)

(52) U.S. Cl.
CPC .......... *G06N 3/08* (2013.01); *G06F 16/2379* (2019.01); *G06F 21/602* (2013.01); *G06N 3/04* (2013.01);
(Continued)

(58) Field of Classification Search
None
See application file for complete search history.

(56) References Cited

U.S. PATENT DOCUMENTS 9,990,687 B1 6/2018 Kaufhold et al.
2019/0244287 A1* 8/2019 Prasad Datta ......... G06N 20/00
(Continued)

FOREIGN PATENT DOCUMENTS

CN 106529673 A 3/2017
CN 107864198 A 3/2018
(Continued)

OTHER PUBLICATIONS

L. T. Phong, Y. Aono, T. Hayashi, L. Wang and S. Moriai, "Privacy-Preserving Deep Learning via Additively Homomorphic Encryption," in IEEE Transactions on Information Forensics and Security, vol. 13, No. 5, pp. 1333-1345, May 2018, doi: 10.1109/TIFS.2017.2787987. (Year: 2018).*

(Continued)

*Primary Examiner* — Saleh Najjar
*Assistant Examiner* — Shadi H Kobrosli

(57) ABSTRACT

Disclosed is a method for constructing an auditable and privacy-preserving collaborative deep learning platform based on a blockchain-empowered incentive mechanism, which allows trainers of multiple similar models to cooperate for training deep learning models while protecting confidentiality and auditing correctness of shared parameters. The invention has the following technical effects. Firstly, the encryption method used by model trainers protects the confidentiality of sharing parameters; furthermore, the updated parameters are decrypted through the cooperation of all participants, which reduces the possible disclosure of parameters. Secondly, the encrypted parameters are stored in the blockchain, and are only available to participants and authorized miners who are responsible to update parameters. Thirdly, the blockchain-based incentive mechanism guarantees the validity of the parameters, where collaborative trainers need to pay deposit when uploading parameters at (Continued)

the beginning and then the shared parameters can be validated. Concretely, if the parameters are invalid, the deposit would be forfeited.

7 Claims, 3 Drawing Sheets

(51) Int. Cl.
    *G06F 21/60*     (2013.01)
    *G06N 3/04*     (2023.01)
    *H04L 9/08*     (2006.01)
    *H04L 9/00*     (2022.01)
    *G06Q 10/10*     (2023.01)
    *G06Q 30/018*     (2023.01)

(52) U.S. Cl.
    CPC .......... *G06Q 10/10* (2013.01); *G06Q 30/0185* (2013.01); *H04L 9/085* (2013.01); *G06Q 2220/00* (2013.01); *H04L 9/50* (2022.05)

(56) References Cited

U.S. PATENT DOCUMENTS

| | | | | |
|---|---|---|---|---|
| 2019/0287026 A1* | 9/2019 | Calmon | ................. | G06N 20/00 |
| 2019/0334716 A1* | 10/2019 | Kocsis | ................... | H04L 9/321 |
| 2020/0082270 A1* | 3/2020 | Gu | ....................... | G06N 3/0427 |
| 2020/0125739 A1* | 4/2020 | Verma | .................... | H04L 9/008 |
| 2020/0202038 A1* | 6/2020 | Zhang | ................... | G16B 20/20 |
| 2021/0218720 A1* | 7/2021 | Oberhauser | ......... | H04L 63/0442 |

FOREIGN PATENT DOCUMENTS

| | | | | |
|---|---|---|---|---|
| CN | 108053031 A | | 5/2018 | |
| CN | 111091467 A | * | 5/2020 | |
| CN | 109145612 B | * | 11/2021 | ........... G06F 21/602 |

OTHER PUBLICATIONS

Hyesung Kim, Jihong Park, Mehdi Bennis, Seong-Lyun Kim; On-Device Federated Learning via Blockchain and its Latency Analysis, v1, pp. 1-4 (Year: 2018).*

Mansouri, M., Önen, M., & Jaballah, W. B. (2018). Learning from Failures: Secure and Fault-Tolerant Aggregation for Federated Learning. (Year: 2018).*

T. T. A. Dinh, R. Liu, M. Zhang, G. Chen, B. C. Ooi and J. Wang, "Untangling Blockchain: A Data Processing View of Blockchain Systems," in IEEE Transactions on Knowledge and Data Engineering, vol. 30, No. 7, pp. 1366-1385, Jul. 1, 2018, doi: 10.1109/TKDE.2017.2781227. (Year: 2018).*

\* cited by examiner

AUDITABLE PRIVACY PROTECTION DEEP LEARNING PLATFORM CONSTRUCTION METHOD BASED ON BLOCK CHAIN INCENTIVE MECHANISM

CROSS-REFERENCE TO RELATED APPLICATIONS

This application claims the benefit of priority from Chinese Patent Application No. 201811471842.X, filed on Dec. 4, 2018. The content of the aforementioned applications, including any intervening amendments thereto, are incorporated herein by reference.

TECHNICAL FIELD

The invention relates to cyberspace security, more particularly to a method for constructing an auditable and privacy-preserving collaborative deep learning platform based on a blockchain-empowered incentive mechanism.

BACKGROUND OF THE INVENTION

1. Deep Learning

Deep learning is a subfield of machine learning which enables practical applications of machine learning. Machine learning basically uses algorithms to perform data analysis and then makes decisions and predictions in real applications. As to learning, training is realized by using a large amount of data, from which how to complete a task via various algorithms is learned.

Training in the deep learning is actually directed to a neural network which consists of millions of neurons that are connected according to a certain rule and laid out in layers. For example, the leftmost layer is referred to input layer for receiving input data, and the rightmost layer is referred to output layer from which output data of the neural network is obtained. Further, there are hidden layers that are invisible to the outside between the input layer and the output layer. The connection weight between two neurons is a parameter of the training model what the model needs to learn, and backpropagation algorithm is one of training algorithms for the neural network.

The backpropagation algorithm mainly consists of incentive propagation and weight update phases. In the incentive propagation, incentive response is obtained upon training inputs into the network. There is a deviation to be calculated between the incentive response and output of interest corresponding to the training inputs, and the deviation is called a response error between the hidden layer and the output layer. Next, the weight is updated using the calculated response error. Particularly, the input incentive and the response error are multiplied to obtain a weighted gradient, which is then multiplied by a ratio and inverted to add to the weight. The two phases are iteratively repeated until the network response to inputs is within a satisfactory and predetermined range to complete the training.

2. Blockchain

Blockchain as a core technology of bitcoin is a decentralized ledger. That is, a central institution will not be involved in the bookkeeping. Traditionally, the bookkeeping is done by the bank so as to ensure the safety and effectiveness of the ledger. However, obviously, the centralized ledger has some defects. For example, crisis or even collapse of the entire system will occur upon the problems in the central institution such as being tampered or damaged; however, the blockchain can overcome those defects of the centralized ledger. But at the same time, how to reach the consistency of accounts or an agreement of individual nodes (i.e., computers) in the blockchain is a key issue to be solved.

Inconsistency

The bitcoin has solved the inconsistency of the decentralized accounting system by means of competitive bookkeeping. The competitive bookkeeping is a mechanism in which each node competes for bookkeeping rights according to their hashrate. In the bitcoin system, a round of competition is held over the hashrate about every ten minutes, and the winner of the competition gets the right to perform bookkeeping to generate a new block in the blockchain. In other words, only the winner of the competition is allowed to synchronize new account information in a certain period of time to other nodes while performing bookkeeping. In the bitcoin system, all the nodes reach the consensus through the competition of hashrate which essentially is the Proof of Work mechanism. In other blockchain systems, however, there are many other algorithms such as Proof of Stake, Delegated Proof of Stake, and Byzantine fault tolerance to reach consensus among the nodes.

Incentive

There are costs of hashrate competition, obviously. Nodes need incentives to perform competitive motivation. In the design of Satoshi Nakamoto protocol, the system will give a certain amount of bitcoin to the winning node of each round as a reward when it completes the bookkeeping. Such computing process is referred to as mining, and the computers that perform the operation are referred to as miners.

Immutability of Transactions

The ledgers in the bitcoin system record transactions. However, unlike the traditional models, delete operation is not available in the blockchain. A backup of corresponding block is created at all nodes when a transaction is uploaded to the blockchain. The data cannot be tempered unless all nodes are tampered at the same time, and thus tempering by no means succeeds. As a consequence, transactions in the blockchain cannot be tampered.

3. Homomorphic Encryption

Ordinary algorithms encrypt data into ciphertext to protect data confidentiality. Unfortunately, nonsensical code will be created generally when the operation result of two encrypted data is decrypted.

Homomorphic encryption is a form of encryption function that allows computation on ciphertexts, generating an encrypted result which, when decrypted, matches the result of the operations as if they had been performed on the plaintext. In this way, the homomorphic encryption can achieve both the protection for data confidentiality and the computation of the encrypted data on the plain text.

The Paillier encryption algorithm is an algorithm for implementing the homomorphic encryption, which satisfies additive homomorphism, i.e., Encrypt (A)*Encrypt (B)=Encrypt (A+B).

4. Comprehensive Application

The output parameters need to be shared at each step of the training so as to achieve collaborative deep learning. The Paillier algorithm can be used to encrypt the parameters to ensure the confidentiality and updateability of the parameters. In order to ensure the auditability of parameters and facilitate the updating of parameters, the data is uploaded to the blockchain for processing based on the immutability and the incentive method of the blockchain. As a consequence, according to the above three methods, the collaborative deep learning is performed while the parameters are auditable and the confidentiality for parameters are guaranteed.

SUMMARY OF THE INVENTION

An object of the present invention is to provide a method for constructing an auditable and privacy-preserving collaborative deep learning platform based on a blockchain-empowered incentive mechanism. This invention is to encourage collaborators to share their parameters in the collaborative deep learning with blockchain-empowered incentives. Also, this invention is to overcome security problems and the reliability of parameters in the parameter sharing process of deep learning. Concretely, security problems refer to the confidentiality of sharing parameters and fairness of collaboration. The reliability of parameters requires that sharing parameters are correctly encrypted following the Paillier encryption algorithm. The security problems and the reliability are realized among collaborators without a trusted third-party platform.

According to the present invention, a method for constructing an auditable and privacy-preserving collaborative deep learning platform based on a blockchain-empowered incentive mechanism, comprising:

encapsulating blockchain task interfaces for parameter sharing of a collaborative deep learning scenario based on an open-source blockchain platform Corda, wherein an intelligent state content is agreed by multiple nodes throughout a network;

constructing a task execution flow model based on a blockchain technology; uploading sharing parameters by participants according to the task execution flow model; encapsulating the uploaded sharing parameters into blocks, and linking the blocks to form a blockchain, or obtaining updated sharing parameters from the blockchain; processing the uploaded sharing parameters based on the task execution flow model; encapsulating the updated sharing parameters into blocks, and linking the blocks to form the blockchain to gain a reward; acquiring the sharing parameters that are updated from the blockchain;

building a parameter sharing platform for the collaborative deep learning scenario; wherein the parameter sharing platform is categorized into three layers comprising an encryption layer, a blockchain layer, and a training algorithm layer;

encrypting the sharing parameters at the encryption layer by a model trainer, and then transmitting the sharing parameters to the blockchain layer through a transmission interface; wherein parameter sharing information of the model trainer is recorded in the blockchain layer; after the sharing parameters are uploaded, miners read the encrypted sharing parameters through the transmission interface for calculating and updating the sharing parameters; after the sharing parameters are updated, the model trainer acquires the updated sharing parameters through the transmission interface to train the model repeatedly.

In some embodiments, the step of encapsulating the blockchain task interfaces for parameter sharing of the collaborative deep learning scenario based on the open-source blockchain platform Corda comprises:

1) evaluating existing blockchain platforms in terms of throughput, storage capacity, the number of nodes, and whether the existing blockchain platforms support a smart contract;

2) selecting a platform with preferred parameters as the blockchain platform; and encapsulating general-purpose interfaces to support uploading, updating and acquisition of sharing parameters of deep learning parameter sharing.

In some embodiments, the task execution flow model comprises:

Param Upload Flow, comprising: user identity, administrator identity, the encrypted sharing parameters and the amount of deposit against malicious users; wherein an output of the Param Upload Flow is a transaction that contains a parameter update status, and is shared by an administrator and the participants, and corresponding information is not available for other users; the participants who behave dishonestly during the operation are identified in the smart contract and corresponding amount of deposit is forfeited;

Updated Param Flow, comprising: miner identity as an updater, administrator identity, and updated encrypted sharing parameters; wherein once results of the sharing parameters updated by miners are verified, the updated sharing parameters are continuously stored in the blockchain, and the miner gains corresponding rewards;

Decrypt Share Flow, comprising: user identity, administrator identity, shared keys that are agreed in advance to assist the decryption, the amount of the deposit for guaranteeing credit, and an identifier of the administrator; wherein the participants each own a part of the shared keys; when all the shared keys from the participants are collected, the participants use the shared keys to call a decryption method in the encryption layer to decrypt the updated sharing parameters, so that sharing parameters required for the next training is obtained;

Updated Param Return Flow for sending parameter update notifications to participants with permission after miner nodes update the sharing parameters; and Download Param Flow, by which the participants with permission obtain updated sharing parameters.

In some embodiments, the task execution flow model comprises five flow types of external encapsulation interfaces through which the sharing parameters are uploaded or downloaded by the users and are updated by the miners; the transaction generated after the flows run form a block which is encapsulated and linked into the blockchain; wherein the sharing parameters from the interfaces are trained immediately, and the interfaces are integrated by the users to automate the entire process without manual confirmation.

In some embodiments, in the encryption layer, participants encrypt the training parameters with the Paillier encryption algorithm, and decrypt the updated encrypted sharing parameters into original parameter forms; meanwhile, the encryption layer further provides static interfaces for miners to update the sharing parameters, and employers are allowed to call the interfaces to update sharing parameters and gain rewards in the blockchain.

In some embodiments, in blockchain layer, Corda is selected as the blockchain platform and used to build and release a new generation of distributed applications CorDapps, and the processing flows are allowed to be written programmatically; users send requests to call each flow in the blockchain layer through an RPC interface, and a transaction is created during the execution of the flow, and an old state is consumed and a new state is constructed; after filling of the information, the identities of the participants are confirmed by signatures of the participants, and then a validity of the transaction is verified through the contract; if confirmed, the information is written into the blockchain layer, and the blockchain ensures a consistency of the information stored by all nodes based on a consensus mechanism provided by the Corda.

In some embodiments, the training algorithm layer acquires the updated encrypted sharing parameters of the blockchain layer, and then decrypts the updated encrypted sharing parameters through the encryption layer, and the new parameters obtained directly participate in the training of the training algorithm layer.

In some embodiments, the step of encrypting the sharing parameters comprises: encrypting partial data of the training parameters using the Paillier encryption algorithm; wherein participants are allowed to encrypt privacy parameters when using their own keys, and the updated sharing parameters are decrypted when shared keys of all the participants are combined.

Compared to the prior art, the invention has the following advantages and effects:
(1) the encryption method used by the model trainer ensures the confidentiality of the parameters, and the process of decrypting the updated sharing parameters requires the cooperation of all participants, thereby further reducing possible disclosure of parameters;
(2) the encrypted sharing parameters are stored in the blockchain in the form of state, and only participants and authorized miners are allowed to access the encrypted sharing parameters; and
(3) the existence of a blockchain-based incentive mechanism ensures the validity of the sharing parameters; participants need to pay deposit when uploading the sharing parameters; if the sharing parameters are invalid, the deposit will be forfeited, thereby ensuring the auditability of the sharing parameters.

DETAILED DESCRIPTION OF EMBODIMENTS

The technical solutions of the invention will be described in detail below with reference to the accompanying drawings and specific embodiments, from which the present invention becomes clearer. Obviously, the embodiment described herein is a part of the embodiments of the present invention. Based on the embodiment of the invention, all other embodiments obtained by those skilled in the art without creative efforts shall fall within the scope of the present invention.

EXAMPLES

Figure 1:
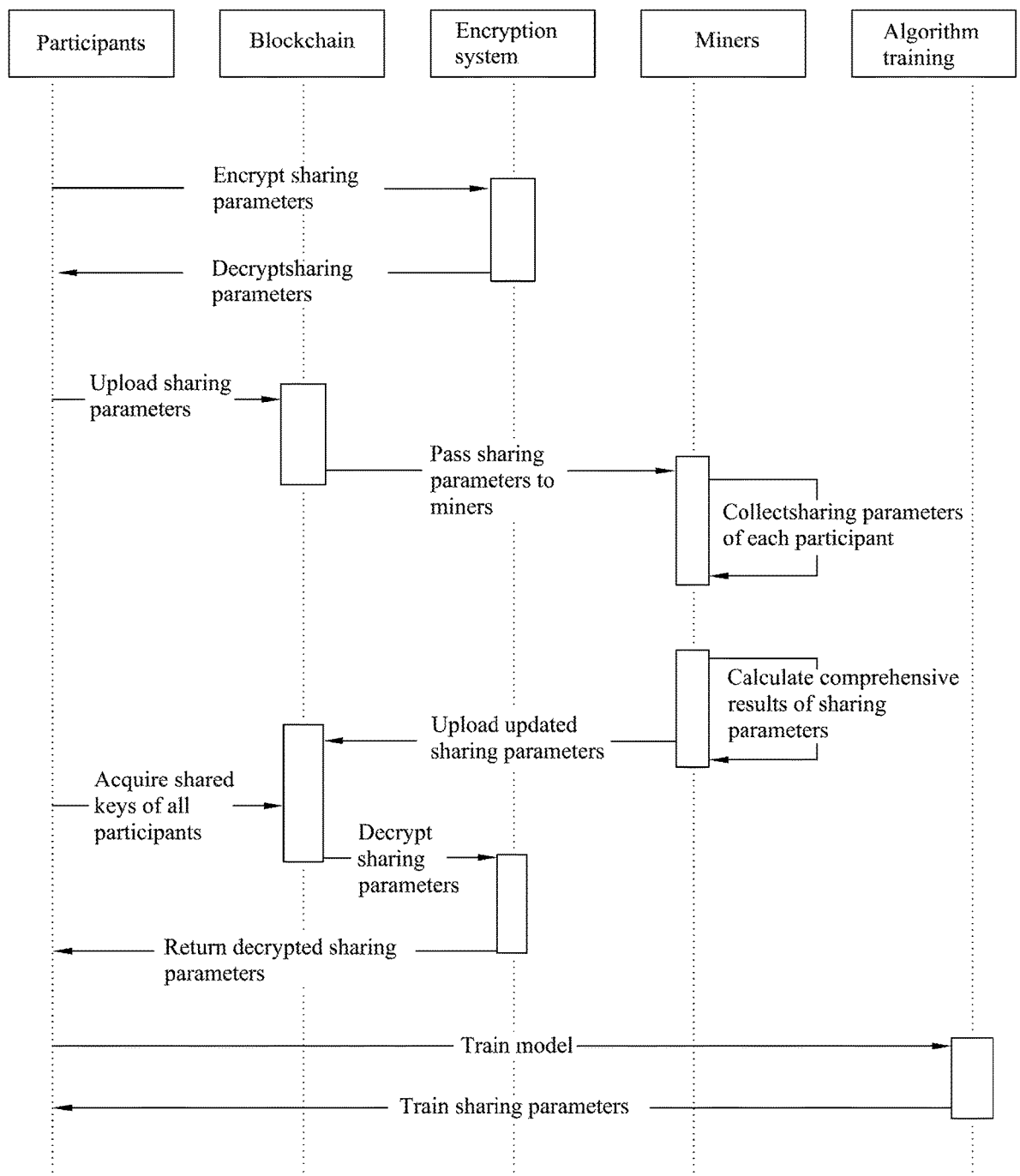
FIG. 1 is an interaction diagram of entities in an auditable and privacy-preserving collaborative deep learning platform based on a blockchain-empowered incentive mechanism according to the present invention.

The embodiments of the present invention are to encourage collaborators to share their parameters in the collaborative deep learning with blockchain-empowered incentives. Also, this invention is to overcome security problems and the reliability of parameters in the parameter sharing process of deep learning. Concretely, security problems refer to the confidentiality of sharing parameters and fairness of collaboration. The reliability of parameters requires that sharing parameters are correctly encrypted following the Paillier encryption algorithm. The security problems and the reliability are realized among collaborators without a trusted third-party platform. FIG. 1 shows an interaction diagram of entities in an auditable and privacy-preserving collaborative deep learning platform based on a blockchain-empowered incentive mechanism.

Figure 2:
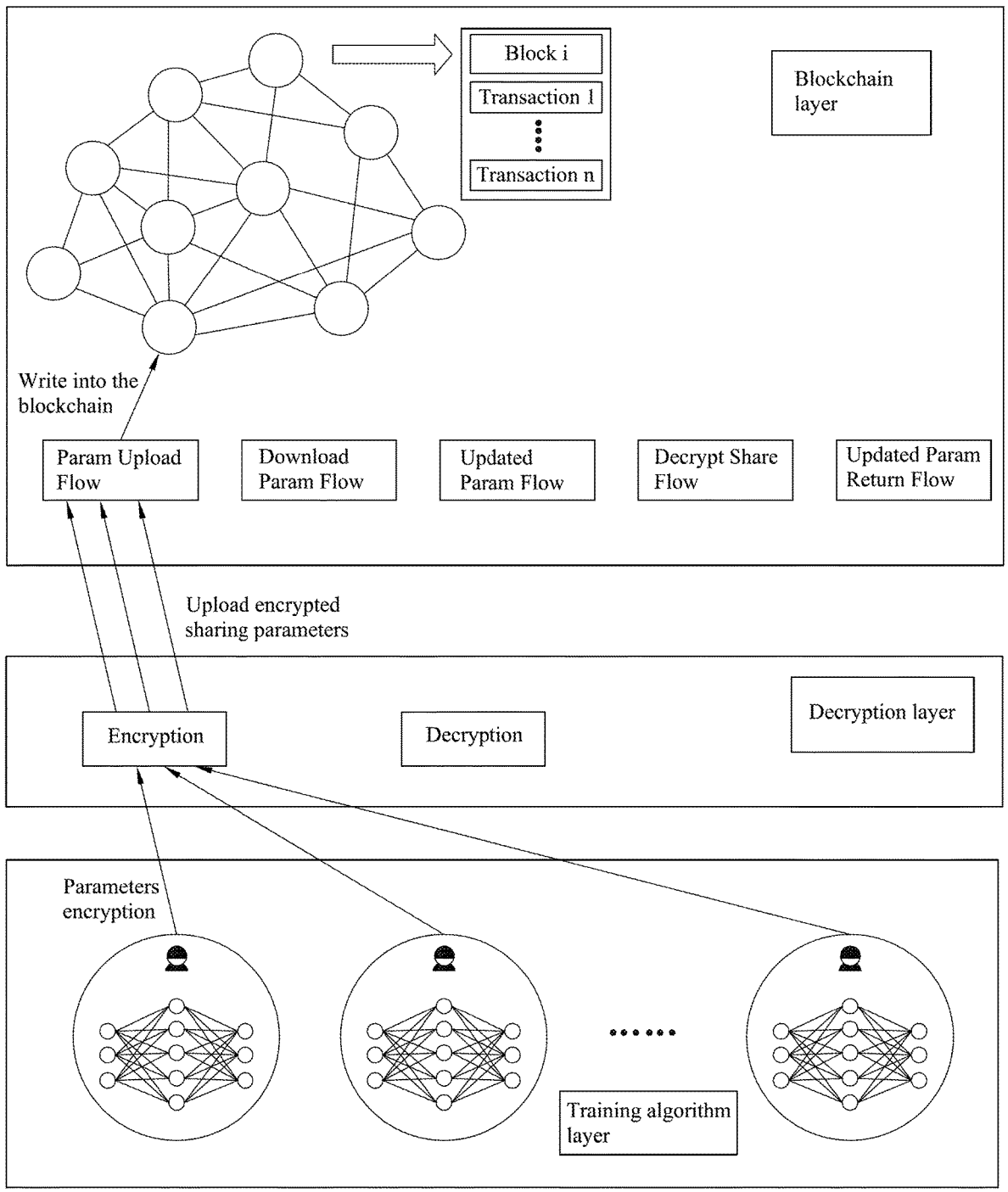
FIG. 2 is a schematic diagram of Param Upload Flow according to an embodiment of the present invention.

A parameter sharing model through flows is established based on a blockchain platform. Such model eliminates centralized server and is not restricted by the third-party platform. In addition, the blockchain platform ensures the immutability and traceability of data. In this embodiment, a general parameter sharing template is designed. Then, model trainers upload the sharing parameters and miners process the sharing parameters based on the template. Also, a task execution flow model is designed. In this model, the sharing parameters uploaded by participants follow this flow to complete the entire life cycle. The overall structure of the platform is categorized into three layers comprising an encryption layer, a blockchain layer and a training algorithm layer, as shown in FIG. 2. The sharing parameters are encrypted, by model trainer, in the encryption layer, and then are transmitted to the blockchain layer through Remote Procedure Call (RPC) interfaces, and next the parameter sharing information of model trainers are recorded in the blockchain layer. After the parameters are uploaded, miners read the encrypted data through the transmission interface for calculation, and accordingly, the sharing parameters are updated. Then, trainers obtain the updated sharing parameters through the transmission interfaces. Further, the model is repeatedly trained by the updated sharing parameters.

This embodiment provides a method for constructing an auditable and privacy-preserving collaborative deep learning platform based on a blockchain-empowered incentive mechanism, including the following steps.

1. Blockchain task interfaces for deep learning parameter sharing scenarios are encapsulated based on the open-source blockchain platform Corda, where an intelligent state content is agreed by multiple nodes throughout a network.

In a certain embodiment, step 1 includes the following steps.
1) Existing blockchain platforms are evaluated in terms of throughput, storage capacity, the number of nodes, and whether the existing blockchain platforms support a smart contract.
2) A platform with preferred parameters is selected as the blockchain platform; and general-purpose interfaces are encapsulated to support uploading, updating and acquisition of sharing parameters of deep learning parameter sharing.

2. A task execution flow model is constructed based on a blockchain technology; parameters are uploaded by participants according to the task execution flow model; the uploaded sharing parameters are encapsulated into blocks, and then the blocks are linked to form a blockchain, or updated sharing parameters are obtained from the blockchain; the uploaded sharing parameters are processed based on the task execution flow model, and then the updated sharing parameters are encapsulated into blocks, and finally the blocks are linked to form the blockchain to gain a reward; the sharing parameters that are updated are acquired from the blockchain.

In a certain embodiment, the execution flow model in step 2 includes the following flows.
(1) Param Upload Flow (PUF), including: user identity, administrator identity, encrypted sharing parameters and the amount of deposit against malicious users; where an output of the Param Upload Flow is a transaction that contains a parameter update state, and is shared by an administrator and the participants, and other users cannot obtain corresponding information; the participants, who behave dishonestly during the operation, are identified in the smart contract and corresponding amount of deposit is forfeited.

Figure 3:
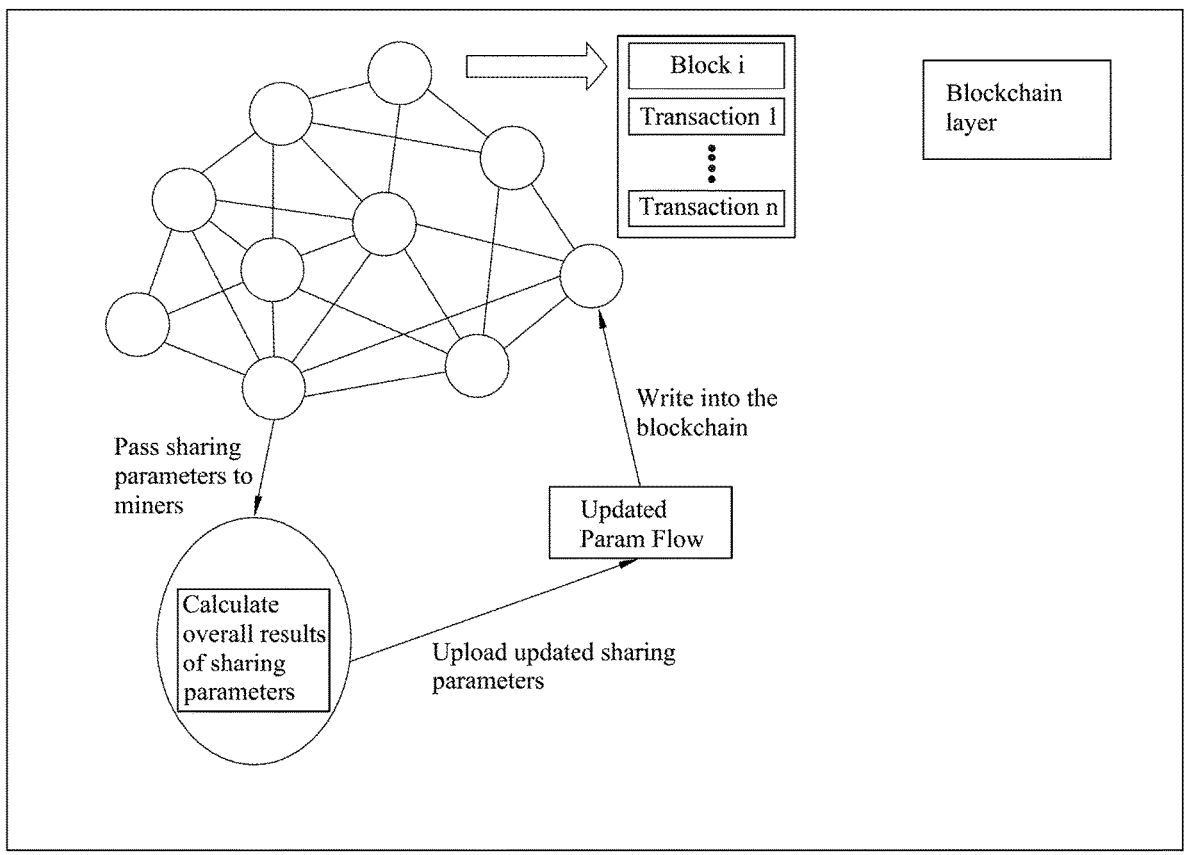
FIG. 3 is a schematic diagram of Updated Param Flow according to an embodiment of the present invention.

(2) Updated Param Flow (UPF), including: miner identity as an updater, the identity of the administrator, and updated encryption parameter values; where once results of sharing parameters updated by miners are verified, the updated sharing parameters are continuously stored in the blockchain, and the miner gains corresponding rewards; the UPF is shown in FIG. 3.

(3) Decrypt Share Flow (DSF), including: user identity, administrator identity, shared keys that are agreed in advance to assist the decryption, the amount of the deposit for guaranteeing credit, and an identifier of the administrator; where the participants each own a part of the shared keys.

When all the shared keys from the participants are collected, the participants use the shared keys to call a decryption method in the encryption layer to decrypt the updated sharing parameters, so that sharing parameters required for the next training is obtained.

(4) Updated Param Return Flow (UPRF) for sending parameter update notifications to participants with permission after miner nodes update the sharing parameters; and (5) Download Param Flow (DPF), by which participants with permission obtain updated sharing parameters.

The Updated Param Return Flow is usually used to notify participants after the sharing parameters are successfully updated. Once participants obtain a notification, it is used as a credential to call the Download Param Flow to acquire the updated sharing parameters. It should be noted that the sharing parameters herein are also encrypted, and the Decrypt Share Flow is called to obtain the key for decryption.

The present invention provides five flow types of external encapsulation interfaces through which the sharing parameters are uploaded or downloaded by the users and updated by the miners; the transactions generated after the flows run form a block which is encapsulated and linked into the blockchain; wherein the sharing parameters from the interfaces are trained immediately, and the interfaces are integrated by the users to automate the entire process without manual confirmation.

3. A parameter sharing platform for parameter sharing of the collaborative deep learning scenario is built: where the platform is catagorized into three layers comprising an encryption layer, a blockchain layer, and a training algorithm layer.

In the platform, the encryption layer and the blockchain layer are isolated from the training algorithm layer; the encrypted sharing parameters to be updated and the updated encrypted sharing parameters are placed on the blockchain layer; instead of uploading to the blockchain platform, the original data of the participants' parameters and other information are kept by the users; the users encrypt the parameters themselves through the encryption layer, and then the encrypted data is uploaded to the blockchain layer for storage through an external interface. Therefore, this not only prevents the insecurity of saving plaintext data, but also reduces the amount of calculation for updating blockchain and improves the efficiency of system operation. Moreover, the updated sharing parameters can be downloaded to train the training algorithm layer.

The encryption layer allows participants to encrypt the training parameters using the Paillier encryption algorithm, and decrypt the updated encrypted sharing parameters to obtain the original parameter form. The static interface can be directly called for encryption and decryption, so that participants can call the given parameters without knowing the internal implementation of the encryption system according to the method, so as to quickly perform encryption and decryption operations, and connect with model training in a seamless manner. At the same time, the encryption layer also provides a static interface for miners to update the sharing parameters, so that employers can call the interface to update the sharing parameters and earn rewards in the blockchain.

The blockchain layer: in blockchain layer, Corda is selected as the blockchain platform and used to build and release a new generation of distributed applications CorDapps. and the processing flows are allowed to be written programmatically; users send requests to call each flow in the blockchain layer through an RPC interface, and a transaction is created during the execution of the flow, and an old state is consumed and a new state is constructed; after information is filled, the participant indentifications are confirmed by signatures of the participants, and then a validity of the transaction is verified through the contract; if confirmed, the information is written into the blockchain layer, and the blockchain ensures a consistency of the information stored by all nodes based on a consensus mechanism provided by the Corda platform.

The training algorithm layer: the training algorithm layer obtains the updated encrypted sharing parameters in the blockchain layer, and then the updated encrypted sharing parameters are decrypted through the encryption layer, and the new parameters directly participate in the training of the training algorithm layer, thereby reducing human processing for the data. Participants only need to call the corresponding upload and update interfaces, so that the process is automatically carried out.

4. Personal privacy information and data are encrypted using an identity-based encryption algorithm, where the personal privacy information and data are only visible to authorized persons.

In the specific embodiment, in step 4, partial data of the training parameters is encrypted using the Paillier encryption algorithm; participants are allowed to encrypt privacy parameters when using their own keys, and the updated sharing parameters are decrypted when the shared keys of all the participants are combined.

The above embodiment is a preferred embodiment of the invention, which is not intended to limit the scope of the present invention. Any changes, modifications, substitutions, combinations, simplifications without departing from the spirit and principle of the invention shall fall within the scope of the invention.

What is claimed is:

1. A method for constructing an auditable and privacy-preserving collaborative deep learning platform based on a blockchain-empowered incentive mechanism, comprising:
   encapsulating blockchain task interfaces for deep learning parameter sharing scenarios based on an open-source blockchain platform Corda, wherein an intelligent state content is agreed by multiple nodes throughout a network;

constructing a task execution flow model based on a blockchain technology; uploading sharing parameters by participants according to the task execution flow model; encapsulating the uploaded sharing parameters into blocks, and linking the blocks to form a blockchain, or obtaining the updated sharing parameters from the blockchain; processing the uploaded sharing parameters based on the task execution flow model; encapsulating the updated sharing parameters into blocks, and linking the blocks to form the blockchain to gain a reward; acquiring the sharing parameters that are updated from the blockchain;

building a parameter sharing platform for parameter sharing of the collaborative deep learning scenarios; wherein the parameter sharing platform is categorized into three layers comprising an encryption layer, a blockchain layer, and a training algorithm layer;

wherein uploading sharing parameters by participants according to the task execution flow model comprises: encrypting training parameters for training a model, at the encryption layer by a model trainer as one of the participants, and then transmitting, by the model trainer, the encrypted training parameters as the sharing parameters to the blockchain layer through a transmission interface; wherein parameter sharing information of the model trainer is recorded in the blockchain layer; after the sharing parameters are uploaded to the blockchain, miners read the encrypted sharing parameters through the transmission interface for calculating and updating the sharing parameters in the blockchain; after the sharing parameters are updated, the model trainer obtains the updated sharing parameters from the blockchain through the transmission interface to train the model repeatedly with the updated sharing parameters, wherein encrypting training parameters comprises:

encrypting partial data of the training parameters using the Paillier encryption algorithm; wherein participants are allowed to encrypt private training parameters when using a common public key, and the updated sharing parameters are decrypted when shared key pieces respective to the public key's private key are combined from all the participants, wherein when all the shared key pieces from the participants are collected, one of the participants use the shared key pieces to call a decryption method in the encryption layer to decrypt the updated sharing parameters, so that the sharing parameters required for the next training is obtained for the one of the participants.

2. The method of claim 1, wherein the step of encapsulating the blockchain task interfaces for the deep learning parameter sharing scenarios based on the open-source blockchain platform Corda comprises:

i) evaluating existing blockchain platforms in terms of throughput, storage capacity, the number of nodes, and whether the existing blockchain platforms support a smart contract; and ii) selecting a platform with preferred parameters as the blockchain platform; and encapsulating general-purpose interfaces to support uploading, updating and acquisition of the sharing parameters of deep learning parameter sharing.

3. The method of claim 1, wherein the task execution flow model comprises:

Param Upload Flow, comprising: user identity, administrator identity, encrypted parameter values and the amount of deposit against malicious users; wherein an output of the Param Upload Flow is a transaction that contains a parameter update state, and is shared by an administrator and the participants, and corresponding information is not available for other users; the participants who behave dishonestly during the operation are identified in the smart contract and corresponding amount of deposit is forfeited;

Updated Param Flow, comprising: miner identity as an updater, administrator identity, and updated encrypted sharing parameters; wherein once results of the sharing parameters updated by miners are verified, the updated sharing parameters are continuously stored in the blockchain, and the miner gains corresponding rewards;

Decrypt Share Flow, comprising: user identity, administrator identity, shared key pieces that are agreed in advance to assist the decryption, the amount of the deposit for guaranteeing credit, and an identifier of the administrator; wherein the participants each own a part of the shared key pieces;

Updated Param Return Flow for sending parameter update notifications to participants with permission after miner nodes update the sharing parameters; and Download Param Flow by which participants with permission obtain the updated sharing parameters.

4. The method of claim 3, wherein the task execution flow model comprises five flow types of external encapsulation interfaces through which sharing parameters are uploaded or downloaded by the users and are updated by the miners, and transactions generated after the flows run form a block which is encapsulated and linked into the blockchain; wherein the sharing parameters from the interfaces are trained immediately, and the interfaces are integrated by the users to automate the entire process without manual confirmation.

5. The method of claim 1, wherein, in the encryption layer, participants encrypt the training parameters using the Paillier encryption algorithm, and decrypt the updated encrypted sharing parameters into original parameter forms; meanwhile, the encryption layer further provides static interfaces for miners to update the sharing parameters, and employers are allowed to call the interfaces to update the sharing parameters and gain rewards in the blockchain.

6. The method of claim 1, wherein, in blockchain layer, Corda is selected as the blockchain platform and used to build and release a new generation of distributed applications CorDapps, and the processing flows are allowed to be written programmatically; users send requests to call each flow in the blockchain layer through a Remote Procedure Call (RPC) interface, and a transaction is created during the execution of the flow, and an old state is consumed and a new state is constructed; after filling of the information, the identities of the participants are confirmed by signatures of the participants, and then a validity of the transaction is verified through the contract; if confirmed, the information is written into the blockchain layer, and the blockchain ensures a consistency of the information stored by all nodes based on a consensus mechanism provided by the Corda.

7. The method of claim 1, wherein, the training algorithm layer acquires the updated encrypted sharing parameters in the blockchain layer, and then decrypts the updated encrypted sharing parameters through the encryption layer, and the new parameters obtained directly participate in the training of the training algorithm layer.

* * * * *